United States Patent [19]

Romer et al.

[11] Patent Number: 5,647,559
[45] Date of Patent: Jul. 15, 1997

[54] APPARATUS FOR FLIGHT PATH CORRECTION OF FLYING BODIES

[75] Inventors: Rudolf Romer, Kaarst; Gerd Wollmann, Oberhausen; Helmut Misoph, Lauf a.d. Pegnitz, all of Germany

[73] Assignees: Rheinmetall Industrie GmbH, Ratigen; TZN Forschungs und Entwicklungszentrum Unterluss GmbH, Unterluss, both of Germany

[21] Appl. No.: 498,651

[22] Filed: Jul. 6, 1995

[30] Foreign Application Priority Data

Jul. 16, 1994 [DE] Germany ............... 44 25 285.4

[51] Int. Cl.$^6$ ................................. F41G 7/26
[52] U.S. Cl. ................. 244/3.13; 356/139.03; 250/206.1
[58] Field of Search ............... 244/3.13, 3.11; 356/139.03; 250/206.1; 102/513

[56] References Cited

U.S. PATENT DOCUMENTS

| | | | |
|---|---|---|---|
| 3,995,792 | 12/1976 | Otto et al. | 244/3.13 |
| 4,003,659 | 1/1977 | Conard et al. | |
| 4,047,816 | 9/1977 | Pell et al. | |
| 4,097,007 | 6/1978 | Fagan et al. | 244/3.11 |
| 4,234,141 | 11/1980 | Miller, Jr. et al. | 244/3.13 |
| 4,373,808 | 2/1983 | Pell et al. | 356/152 |
| 4,433,818 | 2/1984 | Coffel | 244/3.13 |
| 4,634,271 | 1/1987 | Jano et al. | 356/5 |
| 4,652,917 | 3/1987 | Miller | 358/107 |
| 4,676,455 | 6/1987 | Diehl et al. | 244/3.13 |
| 4,709,580 | 12/1987 | Butts, Jr. et al. | 244/3.13 |
| 5,267,014 | 11/1993 | Prenninger | 356/152 |
| 5,348,249 | 9/1994 | Gallivan | 244/3.11 |
| 5,372,334 | 12/1994 | Cuadros | 244/3.11 |
| 5,493,392 | 2/1996 | Blackmon et al. | 356/139.03 |

FOREIGN PATENT DOCUMENTS

| | | |
|---|---|---|
| 0313246 | 10/1988 | European Pat. Off. |
| 2326676 | 9/1976 | France. |
| 2533697 | 7/1975 | Germany. |
| 2853695 | 12/1978 | Germany. |
| 3103919A1 | 2/1981 | Germany. |
| 1342875 | 10/1972 | United Kingdom. |
| 1529388 | 7/1976 | United Kingdom. |
| 2041685 | 12/1979 | United Kingdom. |

Primary Examiner—Michael J. Carone
Assistant Examiner—Christopher K. Montgomery
Attorney, Agent, or Firm—Spencer & Frank

[57] ABSTRACT

An apparatus for flight path correction of flying bodies, such as projectiles, rockets and the like, with the aid of a laser guide beam, wherein the course of the respective flying body is determined and processed in a measuring apparatus associated with the firing apparatus and containing an optical receiving detector in order to obtain an appropriate correction signal, and wherein the correction signal is then transmitted, through encoding of the laser guide beam, to a receiving apparatus disposed in the tail portion of the flying body. To determine the course of the flying body in a simple manner, both an optical light source for producing a light beam and an optical receiving detector are disposed on the measuring apparatus, and triple reflector or mirror elements, that reflect the incident light beam back in its initial direction independently of the respective angle of incidence, are disposed on the bottom of the flying body or at the ends of the guiding mechanism of the flying body. In rotating flying bodies, the triple mirror elements are preferably distributed at irregular intervals in a circle, perpendicular to the longitudinal axis of the flying body. This arrangement makes it possible to use the signals reflected by the triple mirror elements to determine the roll position of the respective flying body.

9 Claims, 2 Drawing Sheets

APPARATUS FOR FLIGHT PATH CORRECTION OF FLYING BODIES

REFERENCE TO RELATED APPLICATIONS

This application is related to Applicants' copending U.S. Pat. applications Ser. Nos. 08/438,619 (which corresponds to German application No. P 44 16 210.3, filed May 7, 1994), and 08/438,018 (which corresponds to German application No. 44 16 211.1, filed May 7, 1994), both of which were filed on May 8, 1995 and both of which are incorporated herein by reference.

This application claims the priority of German application Serial No. 44 25 285.4, filed Jul. 16, 1994, which is incorporated herein by reference.

BACKGROUND OF THE INVENTION

The invention relates to an apparatus for flight path correction of flying bodies, such as projectiles, rockets and the like, with the aid of a laser guide beam. More particularly, the present invention relates to an apparatus for flight path correction of flying bodies such as projectiles, rockets and the like, with the aid of a laser guide beam, wherein the course of the respective flying body is determined in a measuring apparatus, which is associated with the firing apparatus and contains an optical receiving detector, and processed in order to obtain an appropriate correction signal, and wherein these correction signals are then transmitted, through encoding of the laser guide beam, to a receiving apparatus disposed on the tail side in the respective projectile.

To increase hit probability, particularly in combat involving moving targets, correction of the projectile flight path, especially at an increased range, is imperative in addition to optimum fire control and a short flight time. For this purpose, it is necessary to determine the projectile course and, in rotating projectiles, the roll angle position, so that the correction pulses can be triggered at the proper time in order to achieve an approximation of the desired flight path.

To determine the projectile course, it is already known from German Patent No. 25 43 606 C2 and published German Patent application No. 41 10 766 A1 to dispose a light source, for example a pyrotechnical illuminating composition or a laser light source, on the respective projectile, and an optical receiver in a measuring apparatus associated with the firing apparatus. The major disadvantage of these known apparatuses is the outlay associated with the arrangement of a separate light source on the respective projectile.

Also known are apparatuses in which the respective projectile course is not determined by a measuring apparatus associated with the firing apparatus, but by the respective projectile itself. To this end, a laser beam which rotates about the desired flight path of the projectile is used. The receiving apparatus disposed on the side of the projectile then determines the course of the projectile from the delay time between a reference position and the position at which the laser beam impacts the projectile tail. A disadvantage of this apparatus is the relatively high outlay required for the projectile-side receiving apparatus.

SUMMARY OF THE INVENTION

It is an object of the invention to provide an apparatus of the type mentioned at the outset, with which the course of flying bodies can be determined in a simple manner.

This object is generally achieved according to the present invention by an apparatus for flight path correction of flying bodies, such as projectiles, rockets and the like, with the aid of a laser guide beam, which apparatus includes a laser guide beam producing device associated with a firing apparatus for the flying body, and a measuring apparatus, associated with the firing apparatus and containing an optical receiving detector, which determines the course of the respective flying body from signals received by the optical receiving detector, processes the determined course to obtain an appropriate correction signal, and causes the correction signals to be encoded on the laser guide beam for transmission to a receiving apparatus disposed in the tail portion of the respective flying body; and wherein: for determining the course of the respective flying body, the measuring apparatus has, in addition to the optical receiving detector, an optical light source for producing a light beam directed at the flying body; and at least one triple reflector element, which reflects the incident light beam back in its initial direction, independently of the respective angle of incidence, is disposed on a rear surface of the flying body or at ends of a guiding mechanism of the flying body.

The triple reflector element preferably is a triple mirror element and, according to the preferred embodiment, a plurality of these triple reflector elements are disposed on the flying body and are arranged in a circle, oriented perpendicular to the longitudinal axis of the flying body, around a receiving optics for the laser guide beam. The triple reflector elements normally are disposed in the circle at regular intervals. However, in a rotating flying body, the triple mirror elements are preferably distributed at irregular intervals in the circle perpendicular to the longitudinal axis of the flying body, which makes it possible to use the signals reflected by the triple mirror elements to determine the roll position of the flying body.

The essential concept underlying the invention is to perform the course measurement in the measuring apparatus associated with the firing apparatus, as in the above mentioned DE 25 43 606 C2 and DE 41 10 766 A1. Unlike the systems in these two cases, however, not only the optical receiving detector, but also the light source necessary for course measurement are disposed in the measuring apparatus. On the bottom, the respective projectile has one or a plurality of triple reflector elements which reflect the light beam coming from the measuring apparatus back to the measuring apparatus, thus permitting the determination of the position of the flying body in space (tracking).

To achieve good utilization of space on the flying body and the highest possible intensity at the receiving detector, the triple reflector elements are advantageously secured in an approximately circular shape around a receiving optics which is typically disposed centrally, and through which the laser guide beam passes as it travels into the receiving apparatus on the flying body.

In the case of flying bodies possessing a guide mechanism, the triple reflector elements can also be disposed at the ends of the guide mechanism.

When using rotating flying bodies, it has proven particularly advantageous to dispose the triple reflector elements at irregular intervals around the receiving optics. This is because, in this case, the evaluation of the light signals reflected by the triple reflector elements (e.g. by spatially high-resolution matrix detectors) permits the roll position of the respective flying body to be determined in a simple way on the bottom and used in the selection of the correction time. Complicated determination of the roll angle by additional instrumentation in the flying body (e.g., a gyroscope) is omitted in this instance.

Further details and advantages of the invention ensue from the following embodiments described in conjunction with the drawing figures.

DETAILED DESCRIPTION OF THE PREFERRED EMBODIMENT

Figure 1:
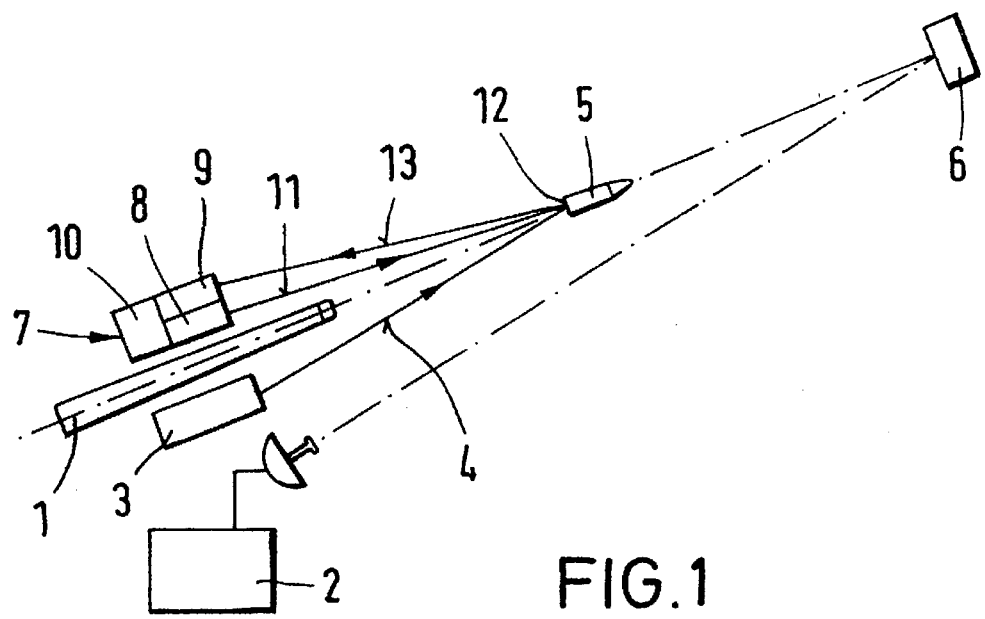
FIG. 1 schematically shows an apparatus for flight path correction of projectiles that includes a firing apparatus and a measuring apparatus according to the invention for determining the projectile course.

Referring now to FIG. 1, a machine gun or automatic cannon 1 having a fire-guidance system 2 for data acquisition, and a laser apparatus 3 for producing a laser guide beam 4 are shown schematically. A flying body or projectile 5 is fired from machine gun 1 at a target 6.

A measuring apparatus 7 essentially comprising a laser 8, an optical receiving detector 9 and an electronic evaluation unit 10, is provided for measuring the course of projectile 5. Laser 8 produces a laser beam 11, which is reflected by triple reflector (mirror) elements disposed on a bottom surface 12 of the projectile 5 and described in detail further below. The reflected laser beam 13 subsequently passes into receiving detector 9 of measuring apparatus 7, and is further processed in evaluation unit 10 in order to determine the course of projectile 5 and, if necessary, to determine the roll position of projectile 5, and to provide any necessary correction signal. The appropriate correction signal produced by the evaluation unit 10 is fed to the laser apparatus 3 which encodes the correction signals on the laser guide beam for transmission to a receiving apparatus disposed in the tail portion of the respective projectile 5.

Figure 2:
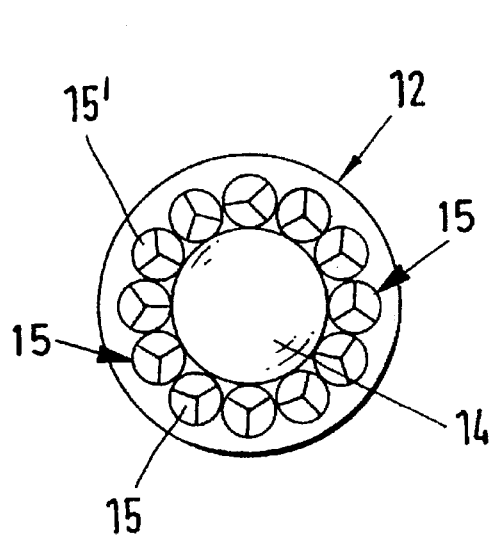
FIG. 2 is a plan view of the bottom of a projectile having triple reflector elements according to the invention disposed at regular intervals in a circle.

FIG. 2 shows a plan view of the bottom or rear surface 12 of projectile 5. A receiving optics indicated by 14 is passed through by guide beam 4 as it travels into a receiving apparatus disposed in the tail or rear part of projectile 5 in order to trigger, in a known manner, appropriate correction pulses for altering the course of projectile 5. Triple reflector elements 15, which reflect laser beam 11 back to measuring apparatus 7 (FIG. 1), are distributed uniformly, i.e., at regular intervals, in a circle perpendicular to the longitudinal axis 100 (see FIG. 4) of the projectile 5 and around the receiving optics 14.

The triple reflector elements 15 are known per se and each includes three mirror surfaces 15' offset from one another by 90° and oriented such that a light beam incident on a surface 15' of a triple element 15 is diverted by 180° after threefold reflection, and returns in the initial direction. The beam diversion is independent of the angle of incidence.

Figure 3:
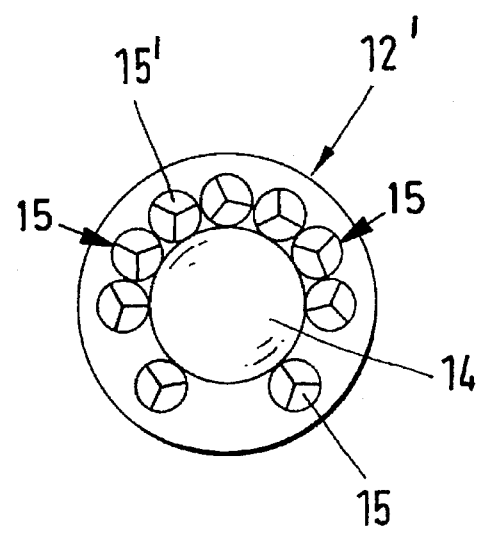
FIG. 3 is a plan view of the bottom of a projectile having triple reflector elements according to the invention disposed at irregular intervals in a circle.

In a rotating projectile 5, the roll position of the projectile must also be known in order to determine the proper correction time and the proper correction angle. In accordance with the invention, the roll position can be determined in a particularly simple way with the aid of the laser light beams reflected by the respective triple reflector elements 15 if the triple elements 15 are distributed at irregular intervals in a circle perpendicular to the longitudinal axis 100 of the projectile 5 and around the receiving optics 14 on the bottom surface of the projectile 5. This is illustrated in FIG. 3. In this instance, the bottom surface of a spin-stabilized projectile is indicated by 12'. The receiving optics for the guide beam is again indicated by 14, and the triple reflector elements are again indicated by 15.

Figure 4:
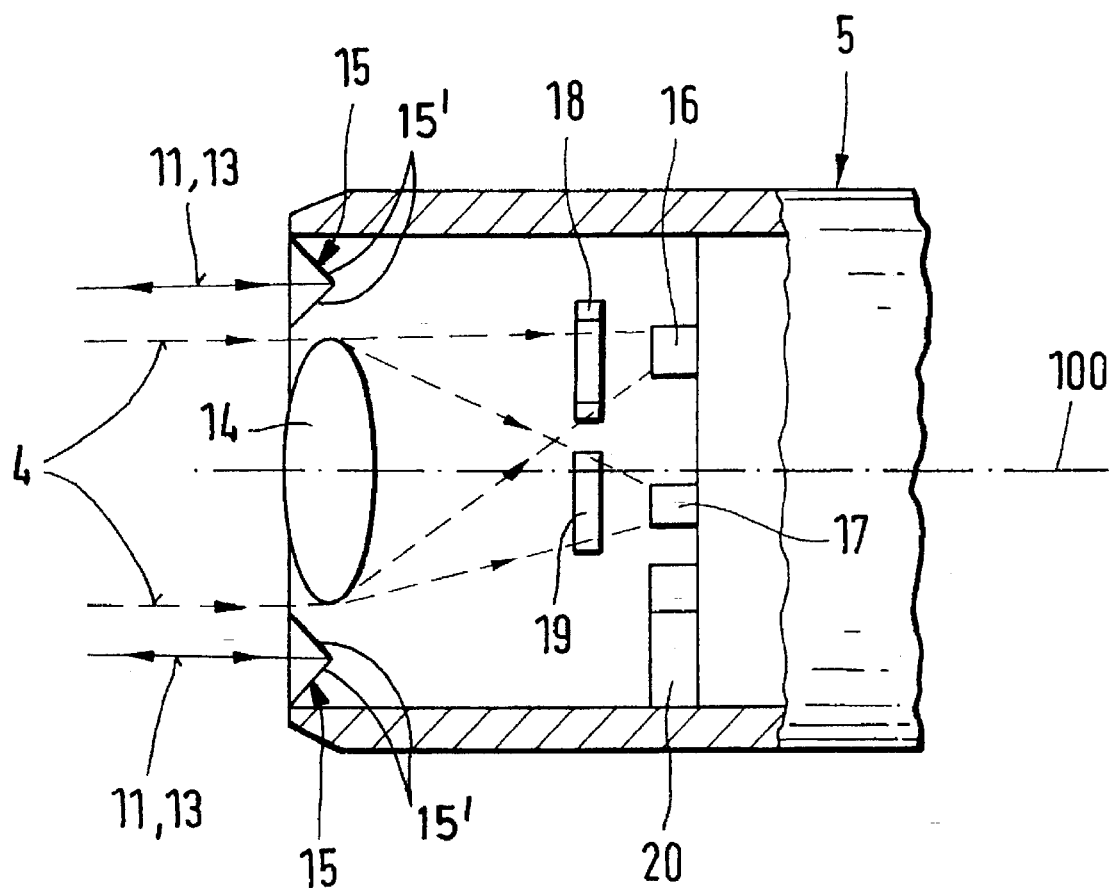
FIG. 4 is a longitudinal section of the tail or rear part of a projectile having triple reflector elements and a receiving apparatus according to the invention.

FIG. 4 shows the longitudinal section of the tail or rear part of a projectile 5 having a projectile bottom surface as shown in FIG. 2. FIG. 4 again illustrates how laser beam 11 is reflected by the surfaces of the respective triple reflector elements 15, and how guide beam 4 passes through receiving optics 14 (indicated as a lens in the illustrated example) into the receiving apparatus. The receiving apparatus of the illustrated embodiment essentially comprises two optical sensors 16 and 17, as well as respective polarizers 18, 19, which are disposed upstream of the sensors 16 and 17 in the direction of the longitudinal axis 100 of the projectile 5, and an electronic evaluation unit 20 which generates appropriate signals for triggering correction charges (not shown). The illustrated embodiment of the receiving apparatus is described in greater detail in the above mentioned copending U.S. patent applications.

Sensor 16 serves as a roll position sensor, and can be omitted in the determination of roll position if the triple reflector elements 15 are disposed at irregular intervals as shown, for example in FIG. 3. Sensor 17 represents the actual receiving sensor for the correction signals. The electrical signals generated by sensor 17 are decoded in evaluation unit 20, and an appropriate position correction of the respective projectile 5 is initiated, for example through the ignition of a correction charge.

The invention now being fully described, it will be apparent to one of ordinary skill in the art that any changes and modifications can be made thereto without departing from the spirit or scope of the invention as set forth herein.

What is claimed:

1. In an apparatus for flight path correction of a projectile with the aid of a laser guide beam, said apparatus including: a laser guide beam producing device associated with a firing apparatus for a projectile; and a measuring apparatus, associated with the firing apparatus and contains an optical receiving detector, which determines the course of the respective projectile from signals received by the optical receiving detector, processes the determined course to obtain an appropriate correction signal, and causes the correction signals to be encoded on the laser guide beam for transmission to a receiving apparatus disposed in a tail portion of the respective projectile; the improvement wherein: for determining the course of the respective projectile, said measuring apparatus has, in addition to the optical receiving detector, an optical light source for producing a light beam directed at the projectile; and a plurality of triple reflector mirror elements, which reflect the incident light beam back in its initial direction to the optical receiving detector independently of the respective angle of incidence, are disposed in a circle on a rear surface of the projectile or at ends of a guiding mechanism of the projectile, with said circle of triple reflector mirror elements being disposed around a receiving optic for the laser guide beam.

2. An apparatus as defined in claim 1, wherein the circle is oriented perpendicular to a longitudinal axis of the projectile.

3. An apparatus as defined in claim 1, wherein the triple reflector elements are disposed at regular intervals.

4. An apparatus as defined in claim 1, wherein the firing apparatus is an automatic cannon or machine gun.

5. In an apparatus for flight path correction of a projectile with the aid of a laser guide beam, said apparatus including: a laser guide beam producing device associated with a firing apparatus for a projectile; and a measuring apparatus, associated with the firing apparatus and containing an optical receiving detector, which determines the course of the respective projectile from signals received by the optical receiving detector, processes the determined course to obtain an appropriate correction signal, and encodes the correction signals on the laser guide beam for transmission to a receiving apparatus disposed in a tail portion of the respective projectile; the improvement wherein: for determining the course of the respective projectile, said measuring apparatus has, in addition to the optical receiving detector, an optical light source for the purpose of producing a light beam directed at the projectile; and a plurality of triple reflector elements, each of which reflects an incident light beam back in its initial direction independently of the respective angle of incidence, are disposed on a rear surface of the projectile, with the plurality of triple reflector elements surrounding a receiving optics for the laser guide beam in an approximately circular shape, and with the respective triple reflector elements being disposed in the circular shape at irregular intervals.

6. An apparatus as defined in claim 5, wherein each triple reflector element is a triple mirror element.

7. An apparatus as defined in claim 5, wherein the circle is oriented perpendicular to a longitudinal axis of the projectile.

8. An apparatus as defined in claim 5, wherein the projectile is a spinning projectile.

9. An apparatus as defined in claim 5, wherein the firing apparatus is an automatic cannon or machine gun.

* * * * *